July 24, 1962   J. BARTHOLOMÄ ET AL   3,046,550
INTERNAL DIELECTRIC MEANS FOR EQUALIZATION OF PATTERNS
DUE TO PERPENDICULAR COMPONENTS OF
CIRCULARLY POLARIZED WAVES
Filed April 11, 1960   3 Sheets-Sheet 1

INVENTORS
Johann Bartholomä &
Albert Schlaud
BY George H. Spencer
ATTORNEY

United States Patent Office 3,046,550
Patented July 24, 1962

3,046,550
INTERNAL DIELECTRIC MEANS FOR EQUALIZATION OF PATTERNS DUE TO PERPENDICULAR COMPONENTS OF CIRCULARLY POLARIZED WAVES
Johann Bartholomä and Albert Schlaud, Ulm (Danube), Germany, assignors to Telefunken G.m.b.H., Berlin, Germany
Filed Apr. 11, 1960, Ser. No. 21,346
Claims priority, application Germany Apr. 17, 1959
9 Claims. (Cl. 343—756)

The present invention relates to a wave guide horn antenna for the transmission of circularly or elliptically polarized electromagnetic waves.

It has been known in the art to use circularly or elliptically polarized waves in radar devices in order to suppress the influence of rain echos. Usually, radar devices are provided with reflector antennas excited by a horn. The circularly or elliptically polarized wave is produced in the antenna feeder. Such wave comprises two components, i.e., a horizontal one and a vertical one, which are linearly polarized and have a phase difference of 90°. Ordinary horns exhibit the undesired effect of transmitted these two components in different radiation patterns. This effect is due to the amplitude distribution in the aperture of the horn, said distribution depending on the polarization thereof. If the device is excited, for example, by an $H_{10}$ wave, the amplitude distribution is homogeneous in the plane parallel to the vector of the electric field, while this aplitude distribution has a consine-shaped configuration in the plane perpendicular to the first-mentioned plane. An ordinary horn is not suitable for transmitting or receiving circularly or elliptically polarized waves, because a wave circularly polarized in the antenna feeder is partially changed into an elliptically polarized wave, due to the radiation pattern in the several angular ranges. An initially elliptically polarized wave leaves the horn with a different axis ratio, i.e., the ratio of the major axis to the minor axis of the initial wave differs from the corresponding ratio of the wave actually emitted. In addition, it is undesirable that the various reflector portions of the reflector antenna transmit different elliptically polarized waves, particularly, the ratio of the elliptical axis varies over various areas of the reflector.

Other horns are known in the art which are provided with tooth-shaped plates protruding into the horn aperture. Such horns have almost the same radiation pattern for the two linearly polarized components, but the teeth distort the pattern by altering the phase velocity at the corners of the horn.

It is, furthermore, known in the art to provide a wave guide horn with a dielectric member protruding from the horn and outwardly terminating in a dielectric plate facing towards the direction of wave propagation. The dielectric member fills the aperture completely in at least one direction. The purpose of this dielectric member is to focus the pattern in one plane. Such horn can not be used for circularly or elliptically polarized waves, because it produces different patterns for the linearly polarized horizontal and vertical components forming a circularly or elliptically polarized wave. This horn, also, could not be used as an exciter transmitter for a parabolic reflected antenna, because it has different phase centers for the horizontally and the vertically polarized components. An exciter horn for a reflector must have but one phase center positioned in the focus of the reflector.

For further examples of the known state of the art, reference may be had to U.S. Patents Nos. 2,650,985 and 2,764,757, which show various types of horns.

It is an object of the present invention to provide a new and improved wave guide antenna horn capable of overcoming the deficiencies of the prior art and of producing the same pattern for vertically as well as for horizontally polarized waves, so as not to distort the various components of a circularly or vertically polarized wave.

According to one aspect of the invention, in a preferred embodiment thereof, at least one dielectric plate is inserted into the horn, which plate does not fill the entire aperture thereof and is positioned in a plane coinciding with the plane in which the patterns of the two perpendicularly polarized waves are to be equalized.

Additional objects and advantages of the present invention will become apparent upon consideration of the following description when taken in conjunction with the accompanying drawings, in which.

The prior art horn 1, designed to produce the same pattern for horizontally and vertically polarized waves, has conductive plates 2, 3, 4 and 5 of triangular configuration mounted adjacent the aperture of the horn 1. The plates 2 and 3, mounted on the left and the right sides of the horn, respectively, operate as short-circuiting elements for the horizontal component of a circularly or elliptically polarized wave, due to the fact that these plates are parallel to the electric field lines pertaining to this horizontal component. The plates 4 and 5, arranged on the top and bottom walls, respectively, do not act upon the horizontal component, because these plates are perpendicular to the field lines. Thus, the effective aperture of this horn for the horizontal component is actually the area bordered by the hatched lines in FIGURE 2. On the other hand, the area in FIGURE 2 designated with dots is the effective aperture for the vertically polarized component.

In predetermining the height of the tooth-like triangular plates, the effective aperture for the horizontally and vertically polarized components can be selected independently of each other. Thus, these plates are a means for equalizing the different patterns of vertically and horizontally polarized wave components. In order to illustrate this pattern equalization, the amplitude distributions for the vertical pattern are plotted in FIGURE 2 to the right of the horn, while the amplitude distributions for the horizontal pattern are plotted below. The arrows associated with the various plots indicate the polarization of the patterns.

Figure 1:
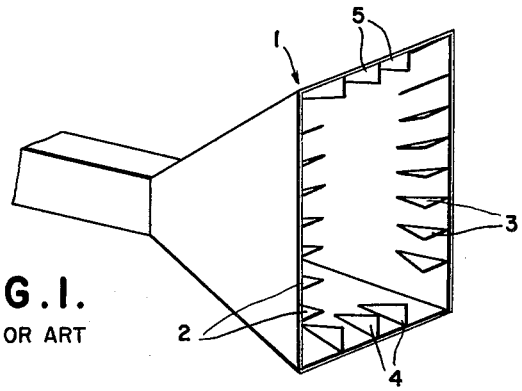
FIGURE 1 is a perspective view of a horn according to the prior art.
Figure 2:
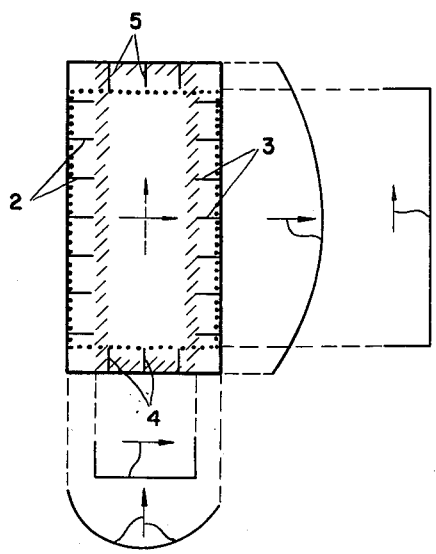
FIGURE 2 is a front view of the horn shown in FIGURE 1, together with amplitude distributions in the aperture of the horn.

The wave guide horn as illustrated in FIGURES 1 and 2 has the disadvantage that there are still distortions of the polarization pattern if any of the length and the width of the aperture is smaller than 1.5 times the wave length.

Figure 3:
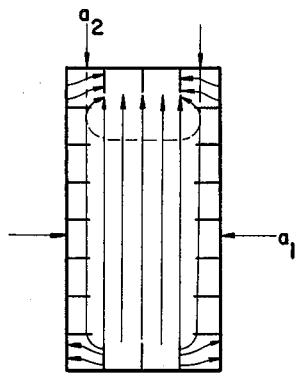
FIGURE 3 is the same view as FIGURE 2, but illustrates the field components as effective in the aperture of the horn.

FIGURE 3 illustrates how these distortions come about. In the case of a horn, such as the one shown in FIGURES 1 to 3, the distortion is particularly effective on the vertically polarized pattern. FIGURE 3 indicates the distribution of the vertical electrical field lines of the initially vertically polarized component. This distribution is substantially undistorted in the center region of the aperture and the field lines remain substantially vertical. However, in the corners of the horn, the field lines are deflected and run almost horizontally. With the aid of the formula for the phase velocity of an $H_{10}$ wave, it can readily be shown that the phase velocity in the corner zones is smaller than in the center of the horn aperture. The phase velocity $v_{H_{10}}$ is given by $$v_{H_{10}} = \frac{c}{\sqrt{1-\left(\frac{\lambda L}{\lambda G}\right)^2}}$$

with $c$ denoting the propagation velocity of an electromagnetic wave in air, $\lambda_L$ the wave length of the wave in air, as fed to the wave guide horn, and $\lambda_G$ the cutoff wave length which is the upper limit for the propagation of waves in a given wave guide or horn. $\lambda_G$ in an $H_{10}$ wave is equal to twice the effective width of the wave guide measured perpendicularly to the field lines. For the center of the horn shown in FIGURE 3, this effective width is $a_1$ and is approximately equal to the geometric width of the horn. However, at the top and bottom of the horn, the effective width $a_2$ is measured along the dashed line, this being due to the field line deflection in the corners, and this length $a_2$ is considerably longer than the geometrical width of the horn or $a_1$. Thus, the $\lambda_G$ value is larger at the top and the bottom of the wave guide horn than in the center thereof and, consequently, the phase velocity as given in the abovementioned formula is larger in the center of the aperture than at the upper and lower edges.

Figure 4:
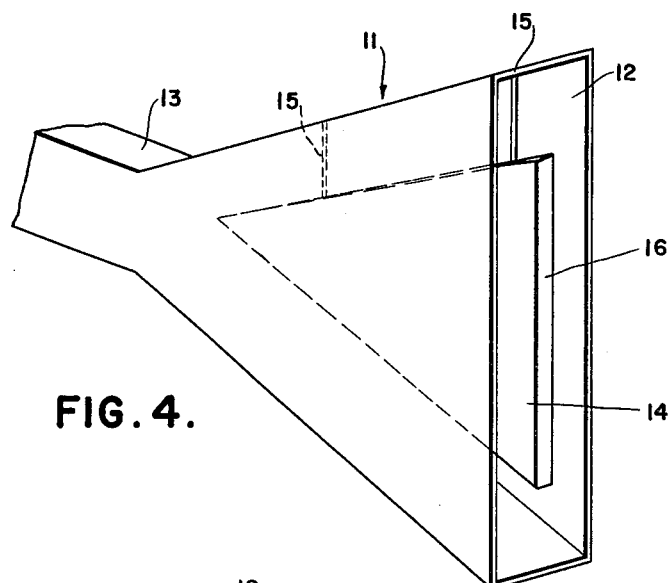
FIGURE 4 is a perspective view of a wave guide horn according to a first embodiment of the invention.

FIGURE 4 illustrates a first embodiment of the horn according to the present invention. A horn antenna 11 has an aperture 12 which is relatively high, while the feeding wave guide portion 13 which is integral with the horn 11, has an approximately square-shaped cross section. This horn serves to generate a broad horizontal pattern and a small vertical pattern. A plate 14 made of a suitable dielectric material and having a triangular configuration is arranged vertically inside of the horn. This plate 14 is held in place in any suitable manner as, for example, by being suspended from the inner top wall of horn 11 by means of thin non-conductive rods 15 made, for example, of polyester with a reinforcement of glass fiber. If, instead, the aperture 12 is covered with a non-conductive plate for weather protection, then the front edge 16 of plate 14 may be mounted on such front plate as a sole or auxiliary support. The triangular shape of plate 14 is of advantage for avoiding reflections.

Figure 5:
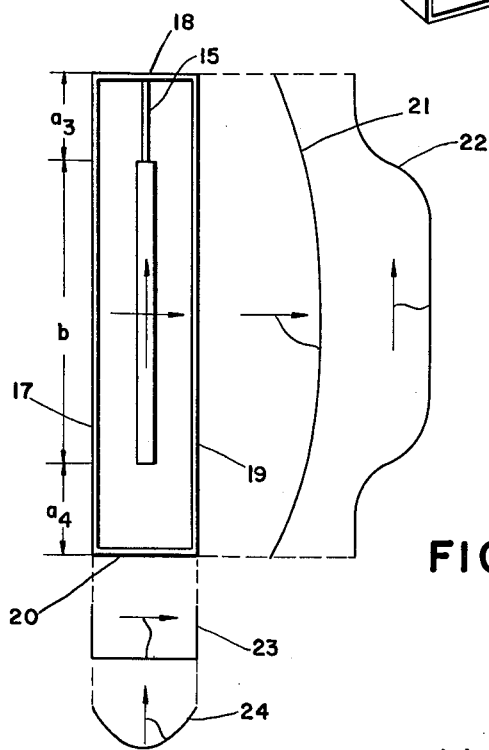
FIGURE 5 is a front view of the horn shown in FIGURE 4, together with amplitude diagrams of the horn aperture.

The operation of this embodiment of the invention will be explained in connection with FIGURE 5, which is a front view of the horn shown in FIGURE 4. Below and to the right of this front view is shown the distribution of the horizontal and of the vertical patterns, respectively, of the various components. The arrows indicate the direction of polarization of the respective horizontally and vertically polarized components of a circularly or an elliptically polarized wave. The density or distribution curve 21 represents the vertical pattern of the horizontally polarized wave component, whether or not the dielectric plate 14 is present. This curve 21 is descriptive of a wave guide horn with or without insertion of plate 14, due to the fact that the voltage between the two walls 17 and 19 does not change when the dielectric plate 14 is inserted into the horn.

However, the vertically polarized component of the vertical pattern behaves differently. The dielectric plate 14 operates as a dielectrical plate-type radiator of the electric field component, the vector of which is parallel to the plate. The energy is guided predominantly along the dielectric plate and, thus, in the portions of the horn aperture designated by $a_3$ and $a_4$, the electric field is weakened to a considerable extent. The amplitude distribution thus produced is designated by 22. Consequently, the vertical pattern of the horn for the vertically polarized component depends primarily on the width $b$ of the dielectric plate 14 and is almost independent of the aperture width $(a_3+b+a_4)$ of the horn which is the distance between wall portions 18 and 20. The latter distance is, therefore, only important for the horizontally polarized component and determines its pattern. As stated above, the dielectric plate has no influence on the horizontally polarized wave. Thus, upon suitable selection of the width $b$ of the dielectric plate 14, it is possible to produce the same vertical radiation pattern of the horn for the vertically as well as the horizontally polarized component. 23 and 24 denote the horizontal patterns for the horizontally and the vertically polarized components, respectively.

Contrary to the known dielectric plate antennas, the horn according to the invention can also be used as an exciter for a parabolic reflector, because the phase centers for the two components polarized in perpendicular planes almost coincide and they are positioned inside of the aperture of the horn thus used.

Figure 6:
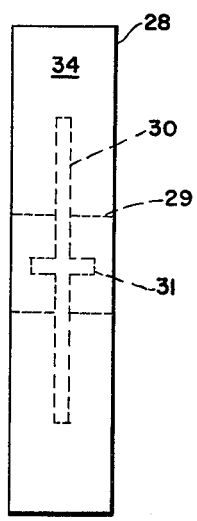
FIGURE 6 is a front view of the wave guide horn according to another embodiment of the invention.

If it is not possible to tune the two horizontal patterns by suitably proportioning the aperture, then another dielectric plate can be used which is positioned perpendicularly to the first plate. This feature is shown in FIGURE 6, illustrating the front view of a horn 28 according to another embodiment of the invention. The side view of the horn corresponds to the side view of the horn shown in FIGURE 4. According to this embodiment of the invention, two crossed dielectric plates 30 and 31 are inserted into the hollow space of the horn. The plate 30 is tapered as was plate 14 in FIGURE 4, but plate 31, preferably, is of rectangular shape. This plate 31 substantially affects only the horizontal pattern for the horizontally polarized component. A dielectric plate 34 covers the aperture of the horn and plates 30 and 31 are secured to plate 34 for supporting them inside of the horn. The wave guide portion communicating with the horn 28 is shown at 29.

Figure 7:
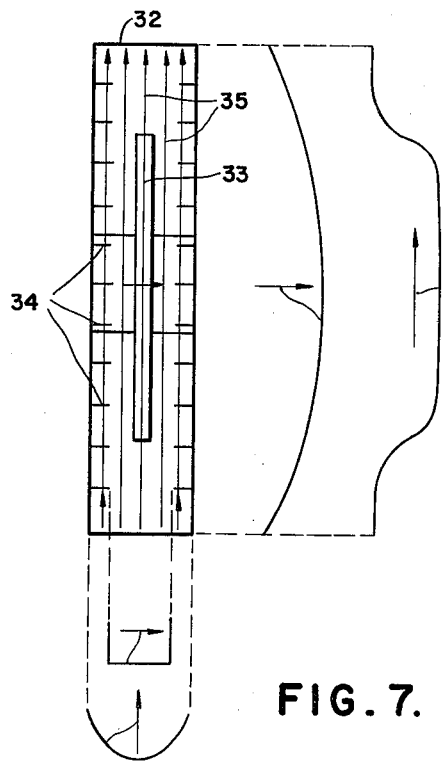
FIGURE 7 is a front view of a wave guide horn according to a further embodiment of the invention, together with several amplitude diagrams as effective in the aperture of the horn as illustrated.

FIGURE 7 illustrates a further embodiment of the invention, the drawing showing again a front view of a horn 32 having a side view similar to that of the horn shown in FIGURE 4. The dielectric plate 33 corresponds to plate 14 in FIGURE 4. The side walls of the horn are provided with conductive plates 34 protruding into the inner portion of the horn. The effective aperture can be defined with these plates 33, as explained above. In this case, the disturbing effect of different phase velocities, mentioned above in connection with FIGURE 3, is avoided because the effective dimensions of the wave guide horn perpendicular to the electric field lines are similar for the partial component in the center as well as in the corners. The field lines 35 clearly illustrate this fact. The amplitude distributions for the vertical and horizontal patterns are also shown to the right and below, respectively, of the horn and the associated arrows denote the polarization of the components whose patterns are plotted.

It will be understood that the above description of the present invention is susceptible to various modifications, changes and adaptations, and the same are intended to be comprehended within the meaning and range of equivalents of the appended claims.

We claim:

1. A wave guide horn antenna comprising: a hollow tapered member having a conductive surface terminating at the end of its largest cross section in an aperture and in a wave guide at the other end; dielectric plate means arranged in said aperture, said plate means being smaller than said aperture in every direction and extending primarily in one plane, and means for supporting said plate means in said member.

2. A wave guide horn antenna comprising: a flaring, conductive and hollow member having a rectangular cross section and a rectangular aperture; substantially flat dielectric plate means in said member, said plate means being arranged perpendicular to said aperture terminating therein and having smaller dimensions in every direction than the hollow space of said member; and means for supporting said plate means in said member.

3. A wave guide horn as set forth in claim 2, said dielectric plate means being of triangular shape with the base coinciding with said aperture without filling it in any direction.

4. A wave guide horn as set forth in claim 2, further comprising conductive tooth-shaped plates mounted in said member adjacent said aperture and protruding towards said dielectric plate means.

5. A wave guide horn as set forth in claim 2, said supporting means comprising electrically insulating rods interconnecting said member and said dielectric plate means.

6. A wave guide horn as set forth in claim 2, said supporting means comprising a second dielectric plate means positioned in said aperture perpendicular to said first plate means and interconnecting said first plate means and said member.

7. A wave guide horn antenna comprising: a flaring, conductive and hollow member terminating in an aperture; a first dielectric plate means positioned in said aperture and a second dielectric plate means positioned in said aperture and oriented perpendicular to said first plate means, said plate means both being smaller than said aperture in every direction thereof.

8. A wave guide horn antenna comprising: a hollow flaring member having an aperture; and dielectric means arranged in said member for equalizing in a predetermined plane the radiation patterns of horizontally and vertically polarized components, said means including a plate portion which lies in said plane and which is dimensioned to be, in said plane, less than the width of said aperture.

9. A wave guide horn as set forth in claim 8, wherein said aperture is closed by a cover plate and wherein said dielectric means extends to said cover plate and is attached thereto.

References Cited in the file of this patent
UNITED STATES PATENTS 2,573,460     Lindenblad  ---------- Oct. 30, 1951
2,692,336     Kock  ------------------ Oct. 19, 1954